US006993578B1

(12) United States Patent
Dmitroca

(10) Patent No.: US 6,993,578 B1
(45) Date of Patent: Jan. 31, 2006

(54) METHOD AND SYSTEM FOR MANAGING PERFORMANCE DATA ABOUT A NETWORK

(75) Inventor: Robert Walter Dmitroca, North Vancouver (CA)

(73) Assignee: Agilent Technologies, Inc., Palo Alto, CA (US)

( * ) Notice: Subject to any disclaimer, the term of this patent is extended or adjusted under 35 U.S.C. 154(b) by 566 days.

(21) Appl. No.: 09/456,603

(22) Filed: Dec. 8, 1999

(51) Int. Cl.
*G06F 15/16* (2006.01)

(52) U.S. Cl. ..................................... 709/224; 702/189
(58) Field of Classification Search ................ 709/224, 709/318; 702/57, 108, 111, 120, 189; 707/100, 707/101, 102, 500.1, 504, 508, 516; 345/660, 345/736, 745, 746, 866
See application file for complete search history.

(56) References Cited

U.S. PATENT DOCUMENTS

| | | | | |
|---|---|---|---|---|
| 4,805,089 A | * | 2/1989 | Lane et al. | |
| 4,896,271 A | * | 1/1990 | Jenq et al. | |
| 4,951,190 A | * | 8/1990 | Lane et al. | |
| 5,138,252 A | * | 8/1992 | Ferguson | |
| 5,226,118 A | * | 7/1993 | Baker et al. | |
| 5,303,367 A | * | 4/1994 | Leenstra, Sr. et al. | |
| 5,495,168 A | * | 2/1996 | de Vries | |
| 5,555,409 A | * | 9/1996 | Leenstra, Sr. et al. | |
| 5,588,099 A | * | 12/1996 | Mogilevsky et al. | |
| 5,592,666 A | * | 1/1997 | Perez | |
| 5,774,669 A | * | 6/1998 | George et al. | 709/224 |
| 5,784,375 A | * | 7/1998 | Kalknte et al. | |
| 5,787,450 A | * | 7/1998 | Diedrich et al. | 707/101 |
| 5,841,781 A | * | 11/1998 | Takeda | |
| 5,883,924 A | * | 3/1999 | Siu et al. | |
| 5,899,992 A | * | 5/1999 | Iyer et al. | |
| 5,926,822 A | * | 7/1999 | Garman | 707/504 |
| 5,933,833 A | * | 8/1999 | Musashi | 707/102 |
| 5,949,976 A | * | 9/1999 | Chappelle | 709/224 |
| 5,966,387 A | * | 10/1999 | Cloutier | |
| 6,003,079 A | * | 12/1999 | Friedrich et al. | 709/224 |
| 6,012,056 A | * | 1/2000 | Menlove | 707/516 |
| 6,035,295 A | * | 3/2000 | Klein | 707/101 |
| 6,049,804 A | * | 4/2000 | Burgess et al. | 707/100 |
| 6,177,929 B1 | * | 1/2001 | Maddalozzo, Jr. et al. | 707/516 |
| 6,216,139 B1 | * | 4/2001 | Listou | 707/508 |
| 6,233,573 B1 | * | 5/2001 | Bair et al. | 707/102 |
| 6,266,674 B1 | * | 7/2001 | Hejna, Jr. | 707/516 |
| 6,275,523 B1 | * | 8/2001 | Chen et al. | |
| 6,275,954 B1 | * | 8/2001 | Herman et al. | 707/516 |

(Continued)

*Primary Examiner*—Andrew Caldwell
*Assistant Examiner*—Stephan Willett

(57) ABSTRACT

The inventive mechanism manages packet delay values that a network incurs in transported data packets. The mechanism uses a plurality of bins for maintaining the number of times that delay values fall within the range of a particular bin. The mechanism also uses a storage array for maintaining delay values that do not fall with the range of the bins. For each delay value that is received, the mechanism determines whether the delay value falls within the bin range. If so, the mechanism increments the number of a particular bin into which the delay value falls within. If not, the mechanism stores the delay value in the storage array and effectively doubles the size of the range of the bins. The mechanism will then effectively re-slot the values into the scaled bins. This allows for the numbers in the bins to used to form graphs detailing the latency of the network for display to a user.

20 Claims, 2 Drawing Sheets

U.S. PATENT DOCUMENTS

| | | |
|---|---|---|
| 6,286,007 B1 * | 9/2001 | Miller et al. ................. 707/101 |
| 6,289,352 B1 * | 9/2001 | Proctor ....................... 707/102 |
| 6,314,463 B1 * | 11/2001 | Abbott et al. ............... 709/224 |
| 6,321,264 B1 * | 11/2001 | Fletcher et al. ............. 709/224 |
| 6,324,540 B1 * | 11/2001 | Khanna et al. ............. 707/102 |
| 6,381,628 B1 * | 4/2002 | Hunt |
| 2001/0049699 A1 * | 12/2001 | Pratley et al. .............. 707/508 |
| 2002/0013791 A1 * | 1/2002 | Niazi et al. ................. 707/516 |

* cited by examiner

METHOD AND SYSTEM FOR MANAGING PERFORMANCE DATA ABOUT A NETWORK

BACKGROUND

Latency graphs, which are plots of time delay verses frequency of occurrence, are key measures of the performance of a packet switched network, such as the Internet. Latency graphs are used in the calculation of jitter. Jitter is a degradation in the quality of real-time services such as video or voice applications caused by inconsistent delays in the transmission of data packets, i.e. some packets arrive later and other packets arrive earlier. Real-time applications require a constant rate of data, and if the data is unduly delayed, then the service deteriorates. For example, when a voice service suffers from jitter, the conversation is distorted as portions are faster than normal and other portions are slower than normal. Thus, latency graphs are an important metric in measuring the performance and quality of service of a packet network.

FIG. 4 depicts a typical arrangement for measuring packet latency 40. Node A 41 sends a datagram or data packet into the network 42. The measurement system 43 notes the time when the packet enters the network 42 via an entry time stamp. As the packet emerges at node B 44, it is assigned an exit time stamp. The measurement system 43 calculates the delay of the packet from the time stamps. This delay information is then stored to memory, and used to calculate a latency graph.

FIG. 5 depicts a example of a latency graph 50 that shows the delay information from the network of FIG. 4. These graphs 50 are normally bar graphs. The x-axis 51 is the time delays in milliseconds (ms) and the y-axis 52 is the number of packets which have been delayed by the time shown on the x-axis 51. For example, the graph 50 indicates that 20 packets had delays between 100 to 200 ms and that 50 packets had delays between 1400 to 1500 ms. These graphs are used to estimate the jitter that a real-time service would see in a network. Jitter is a key measure to estimate the quality of service for services such as voice or video. Jitter measurements are also key in the design of packet networks, as they may be used to size buffers.

One mechanism used to create latency graphs is known as the off line method. The measurement system 43 stores the calculated delay values over a period of time, and then computes and constructs the graph off-line. This mechanism worked well until the network speeds increased. As a result of the network speeds, this mechanism has two main problems. The first problem is that since the network speed are so high, the measurement system 43 has to store an a large number of data points to calculate the latency being incurred by a packet network. In other words, this mechanism requires a large amount of memory. For example on a Gigabit Ethernet link 1.7 billion packets may be carried in 10 minutes, and thus the measurement system would have to store 1.17 billion results. The second problem is that the latency graphs are not calculated in real-time, e.g. 10 minutes must pass before a latency graph is available. Thus, there is no way to obtain real-time latency information.

Another mechanism is a real-time bin mechanism. With this mechanism, the measurement system 43 creates a set of bins or time slots in which results will be slotted. Note that the number of bins and their size must be created before the test is run. A bin represents a range of delay time, e.g. 100 to 199 ms. The value stored in the bin is the number of occurrences of a delay in the range of the bin. Thus, as each new delay is determined, the appropriate bin value is incremented. The delay graph is then calculated from this information. This mechanism solves the problems of the offline method. Note that a large amount of memory is not required as the bin values are incremented when the delay value are determined, and thus the individual delay values do not have to be stored. The values of the various bins can be displayed at any time, and thus, this mechanism provides real-time information of the network latency. However, this mechanism has a problem in that the size and range of the bins must be determined before the test is run. If the bin range is too large, then all of the data will be clumped into a small number of the total available bins. For example, if the range is selected to be in 200 ms increments (bin 1 is 0 to 199 ms, bin 2 is 200–399 ms, etc.) and all of the values fall within bin 1, then little information about the latency of the network is gained. On the other hand, if the bin range chosen is too small, then data will be lost. For example, if the range for each of five bins is selected to be in 200 ms increments, then the range form bin 1 is 0 to 199 ms, bin 2 is 200–399 ms, ... and bin 5 is 800–999. If a delay of 1050 ms should arrive, then there is no bin to increment, and thus, this data would be lost. Consequently, tests must be run multiple times before meaningful results are obtained. If the event being tested is a one-time event or unique event, then this mechanism may not perform properly.

Therefore, there is a need in the art for a testing mechanism that will produce real-time latency graphs and use little memory, but does not use predetermined bin ranges.

SUMMARY OF THE INVENTION

These and other objects, features and technical advantages are achieved by a system and method which uses adaptive bin sizing during delay value collection.

The inventive mechanism begins with a small bin range and then increases the range as required. The inventive mechanism uses an array to serve as the delay bins, with each element of the array representing a separate bin. Each delay value will cause a particular element of the array to be incremented. The particular bin which will be incremented is determined from the delay value. If the delay value is larger than the range of the largest ranged bin, then range of the bins must be adjusted. This adjustment must take the values of the original array and compress them into the new ranges. For example if bin range is doubled, then each new bin in the lower half of the array must be the sum of two adjacent bins, and the upper half of the array must be set to zero. This adjustment in bin size must be made quickly, as delay values are arriving during the adjustment. For example, in a gigabit-bit Ethernet link with packets 64 byte packets, a delay value would arrive into the measurement system every 512 ns. Note that software is too slow to handle the adjustment, and thus hardware is used to re-compute and re-fill the bins. The information stored in the bins is used to form latency graphs. The values of the various bins can be displayed at any time, and thus, the inventive mechanism provides real-time information of the network latency.

Therefore, it is a technical advantage of the present invention to calculate real-time latency graphs.

It is another technical advantage of the present invention that bins are used to store the number of packets that have delays within particular ranges, and thus large amounts of memory are not required.

It is a further technical advantage of the present invention that bin ranges are not fixed, and can be re-sized based upon the received delay values, and thus the selection of the initial bin ranges is not critical.

It is a still further technical advantage of the present invention that the inventive mechanism will scale to any network speed, and thus does not require prior knowledge of the network.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
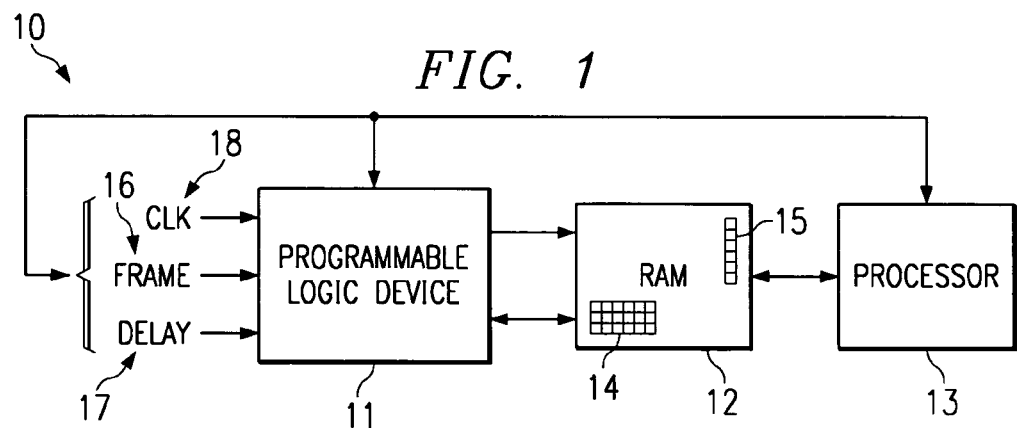
FIG. 1 depicts a block diagram of the inventive mechanism which includes a programmable logic device, portions of RAM memory, and portions of the processor.

The inventive mechanism uses an array for the delay bins, with each element of the array representing a separate bin. Let bin_array[num_bin] be an array of memory with elements from 0 to num_bin-1. Each array element of the array represents a bin. Let bin_size be a variable which stores the size or range in time of a bin. Thus, each bin stores a value that indicates the number of packets that have experienced a delay that falls within bin_size. Each received delay value will cause a particular element of the array bin_array[ ] to be incremented. The particular bin which will be incremented is determined from the delay value, i.e. integer truncation (delay value/bin_size). For example, assuming five bins with 100 millisecond (ms) bin size would result in the following bin arrangement: bin 0=0 –99 ms; bin 1=100–199 ms; bin 2=200–299 ms; bin 3=300–399 ms; and bin 4=400–499 ms. A delay value of 207 would yield 207/100=2.07 truncated to 2, and thus bin 2 would be incremented by 1.

Thus, the total delay range for the above example is 0–499 ms. Therefore, if a delay value is larger than the largest ranged bin, i.e. integer truncation (delay value/bin_size) >num_bin-1 or greater than 499 ms, then the range of the bins must be adjusted to allow for this delay value to be counted. The adjustment performed by the inventive mechanism is to double the bin_size and compress the values into the new bins. Thus, the lower half of the array of the doubled bin_size is the sum of two adjacent bins and the upper half of the array of the doubled bin_size comprises zeros.

Note that the received delay value may greatly exceed the delay range, and would require multiple doubling of the bin_size in order to fit into a bin. For example, consider a system that has 10 bins and the bin_size is 1 ms. If a delay value 1000 ms is received, then the bin would need to be doubled seven times before the delay value would fit. However, performing multiple doublings at one time may result in exceeding the time available for performing the adjustment dynamically. Note that in a gigabit-bit Ethernet link using 64 byte packets, a delay value would arrive into the measurement system every 512 ns. Thus, there is not much time to perform multiple doublings of the bin_size. Instead, when the inventive system receives a delay value that exceeds the delay range, the inventive mechanism performs a only single doubling, Thus, the delay value may not fit into the increased delay range. However, as each subsequent delay range is received, additional doublings may result. Thus, the delay range will quickly converge to the optimal range. This is shown in the following table, wherein the number of bins or num_bin is 512 and the initial size of a bin or bin_size is 100 ns, which results in a delay range of 0 to 51.199 $\mu$s. Thus, the measurement system could record delays from 0 to 51.199 $\mu$s. Note that ns is nanoseconds, $\mu$s is microseconds, ms is milliseconds, s is seconds, and h is hours.

| Doublings | bin_siz | Delay Range |
| --- | --- | --- |
| Initial | 100.0 ns | 0–51.199 $\mu$s |
| 4 | 1.600 $\mu$s | 0–819.199 $\mu$s |
| 8 | 25.60 $\mu$s | 0–13.107199 ms |
| 12 | 409.6 $\mu$s | 0–209.715199 ms |
| 16 | 6.554 ms | 0–3.355443199 s |
| 20 | 104.9 ms | 0–53.687091199 s |
| 24 | 1.678 s | 0–858.993459199 s |
| 28 | 26.84 s | 0–3.81774870756 h |

The delay value that caused the doubling by being too large is stored into a temporary array tstore. The tstore array would be emptied at the conclusion of the test run or when the results are to be displayed, and the delay values stored therein would be slotted into the bin array. Since the doubling approach causes the bin_array array to quickly converge on the right size, the depth of the tstore array only needs to be about 30 elements. Therefore, the array bin_array[ ] holds delay information, and the array tstore[ ] holds delay values which exceeded the bin_size*num_bins. For each delay value received by the inventive mechanism, the mechanism determines whether the delay value will fit into the current delay range, if so the mechanism increments the appropriate bin, if not then the bins are resized once and the delay value is stored in the tstore [ ] array. Note that if one delay value is a spike, which is much higher than all of the other values, the single spiked delay value will still be recorded in the tstore[ ] array and thus not lost. Off line processing can then take care of reporting such a spike.

Note that the mechanism can be initialized to a very low bin_size, e.g. 1 ns, 10 ns, etc. The inventive mechanism would then quickly converge to a useful delay range for the network being tested, via the doublings of the bin size. Moreover, note that the delay values which caused the resize are not lost, but rather are stored in the tstore[ ] array and would be slotted into the appropriate bins at a later time. Thus, prior knowledge of the network with respect to delay values is not needed, and the mechanism will work with any network. Note that the network can be any network, e.g. LAN, WAN, Intranet, or Internet.

As stated above, the adjustment performed by the inventive mechanism is to double the bin_size and compress the values into the new bins. Thus, the lower half of the array of the doubled bin_size is the sum of two adjacent bins and the upper half of the array of the doubled bin_size comprises zeros. However, this adjustment is separated into two phases, one performed during real-time, and the other phase performed off-line. This separation is to ensure that the inventive mechanism can properly operate at high network speed, e.g. a delay value being generated every 512 ns. Essentially, the creation of the different sized bins and the compression of the values into the different sized bins is performed off-line via software, while the collection and slotting of the delay values is performed in real-time via hardware. The inventive mechanism uses a bin_array array that is two dimensional. Each row (or column) represents one set of bins. When the bins need to be re-sized, a pointer is incremented to point to the next row (or column) of the array, which is the next set of bins. When the test is complete or when a user requests to view the current data, data from all of the bins is regrouped into the set of bins having the largest range. Note that at this time, the data in the tstore [ ] array is also moved into the bins.

The following is a pseudo-code representation of the inventive mechanism.

Define the number of bins as NUM_BIN.
Define the starting size of a bin as BIN_SIZE.
Define the maximum number of bin resizings as DEPTH
Create the bin storage array as BIN_ARRAY, its size being NUM_BIN * DEPTH ie. this BIN_ARRAY is capable to store DEPTH sets of NUM_BIN bins.
Create the temporary delay storage array as TSTORE, its size being DEPTH.
Define the index pointing to the current location of TSTORE as INDEX.
Initialize INDEX to point to the first location of TSTORE as 0.
Define the index pointing to the current location of BIN_ARRAY as BIN.
Define the bin from the NUM_BIN bins whose range will encompass a given delay value as BIN_FIT.
Storage:
For every delay value do
If the delay value is less than NUM_BIN * BIN_SIZE then
　Set BIN_FIT to (delay value)/BIN_SIZE rounded down to the nearest integer.
　Set BIN to (INDEX * NUM_BIN+BIN_FIT)
　Increment the value found at position BIN in the BIN_ARRAY by 1.
Else
　store the delay value in TSTORE at the location pointing to by INDEX
　increment INDEX by 1 to point to the next location in TSTORE
　double BIN_SIZE
Retrieve and Display:
Compress the values in the (INDEX+1) sets of bins used for delay storage as follows:
　Compress the values in the $1^{st}$ set of bins used INDEX times:
　　Each compression is done as follows: add the values in the first two bins (#0 & #1) and store it in the first bin #0, add the values in the next two bins (#2 & #3) and store it in the $2^{nd}$ bin #1, add the values in the next two bins (#4 & #5) and store it in the $3^{rd}$ bin #2, . . . add the values in the last two bins (#(NUM_BIN-2) & #(NUM_BIN-1)) and store it in the (NUM_BIN/2)th bin #(NUM_BIN/2-1).
　　After the first compression, set the values of the upper half of the bins, (bins #(NUM$_{13}$BIN/2) TO #(NUM_BIN-1)) to 0.
　Compress the values in the 2dn set of bins used (INDEX-1) times.
　After the first compression, set the values of the upper half of the bins to 0.
　. . .
　Compress the values in the INDEXth set of bins once.
　After the first compression, set the values of the upper half of the bins to 0.
　Compress the values in the (INDEX+1)th set of bins zero times.
Add the values from all (INDEX+1) sets of compressed bins together into one set of bins that will represent the data suitable for graphing:
　For each bin #x, from #0 to #(NUM$_{13}$ BIN-1), in the first set of bins do:
　　Add values from the same bin number #x from all (INDEX+1) sets of bins and store it in bin #x.

The portion of the pseudo-code marked as storage should be implemented in hardware to ensure that information from high speed networks is properly handled and not lost. The remaining portions of the pseudo-code may be handled by software in an off-line manner. Alternatively, these portions may be implemented in hardware or firmware. Note that if bin_size and num_bin are chosen to be binary values, the multiplication and division operations of the above real-time pseudo code portion reduce to logical shifts in hardware.

Figure 4:
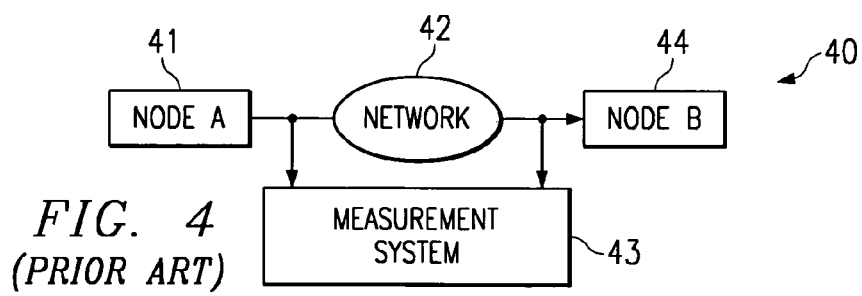
FIG. 4 depicts a prior art arrangement for measuring packet latency of a network.

FIG. 1 depicts a block diagram of the inventive mechanism 10 which includes programmable logic device 11, and portions of RAM memory 12. The inventive mechanism also includes portions of the processor 13. The inventive mechanism 10 would be incorporated into the measurement system 43 as shown in FIG. 4. The inventive mechanism would use the prior art mechanisms for calculating and receiving delay values from packets being transported by network 42, as well as forming and displaying the latency graphs from the delay values. Note that the delay calculation is the difference between the exit and the entry time stamps.

The programable logic device 11 is the hardware implementation of the real-time portion of the pseudo-code detailed above. The processor 13 is operating the off-line portions of the pseudo-code detailed above. The RAM memory 12 holds the bin information, particularly the bin_array [ ] array 14. The RAM memory 12 could also hold the tstore [ ]array 15. As an alternative embodiment, the tstore [ ] array 15 could be implemented inside the programmable logic device 11.

Figure 5:
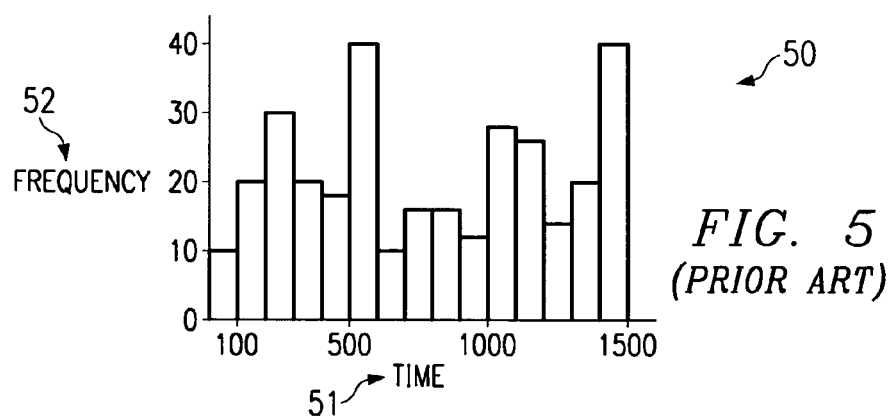
FIG. 5 depicts an example of a latency graph that shows the delay information from the network of FIG. 4.

The inventive mechanism 10 operates as follows. The processor executes a program based on the pseudo-code detailed above, and creates the tstore [ ] array and the bin_array [ ] array, and assigns initial values for num_bin (the number of bins) and bin size (the size of the bins). The processor 13 (or an adapter card) extracts the packet information from the network 42, and computes the delay values 17 for packets being transported on the network 42. The processor 13 sends a frame signal 16 to the programmable logic device (PLD) 11 that implements the real-time portion of the pseudo-code detailed above. The frame signal 16 indicates the start of the frame and indicates to the PLD 11 that a delay value 17 is being sent. Note that the frame signal is simply a pulse on the frame signal line that indicates to the PLD when a new delay value is being sent. Without the frame signal, the PLD would not be able to judge at what point in time, the information on the delay line to the PLD is actually a delay value. Subsequent to or simultaneous with the frame signal 16, the processor 13 sends the delay value 17 to the PLD 11. The processor 13 also sends clock signal CLK 18 to the PLD 11 to synchronize the PLD operations. The PLD 11 then determines whether the delay value 17 would fit in the current bins 14. If so the PLD increments the value of the appropriate bin of the bin array 14. If not, then the PLD 11 stores the delay value 17 into the tstore [ ] array 15, and re-sizes the bins by incrementing a pointer to point to the next row (or column) of elements of the bin array 14. This operation repeats for each delay value 17 delivered by the processor 13, and will continue until the end of the test or until a user queries the mechanism 10. At such time, the processor 13 will merge the data in the different bin sets 14 into the last used bin set, which will be the bin set with the largest delay range. The processor 13 will also slot in the delay values stored in the tstore [ ] array 15 into the last used bin set. The processor will then use the data stored in the last used bin set to create and display a latency graph, an example of which is shown in FIG. 5.

Note that the frame signal 16 and the delay value 17 may original from a hardware device (not shown). This device would receive the information from the network 42, and compute the delay values 17 for packets being transported on the network 42 instead of the processor 13. This device would be incorporated into the measurement system 43, and would be coupled to the network (either directly or through an adapter card). The device would then extract the packet information from the network and compute the delay values from this information. This arrangement would free up the processor 13 and allow the allow the processor 13 to execute other off-line portions of the program. For example, the processor 13 could merge the data from the previous bin sets into the last current bin set (which is the used bin set adjacent to the current bin set), while the PLD 11 independently operates on delay values 17 being written into the current bin set. Thus, upon completion, the processor would only have two bin sets to merge, the current bin set and the last current bin set. Moreover, the control over the bin sets can be multiplexed between the processor 13 and the PLD 11, such that both can write to the same bin set as needed. Thus, the processor can merge all previous bin sets into the current bin set, while the PLD write data into the current bin set.

Figure 2:
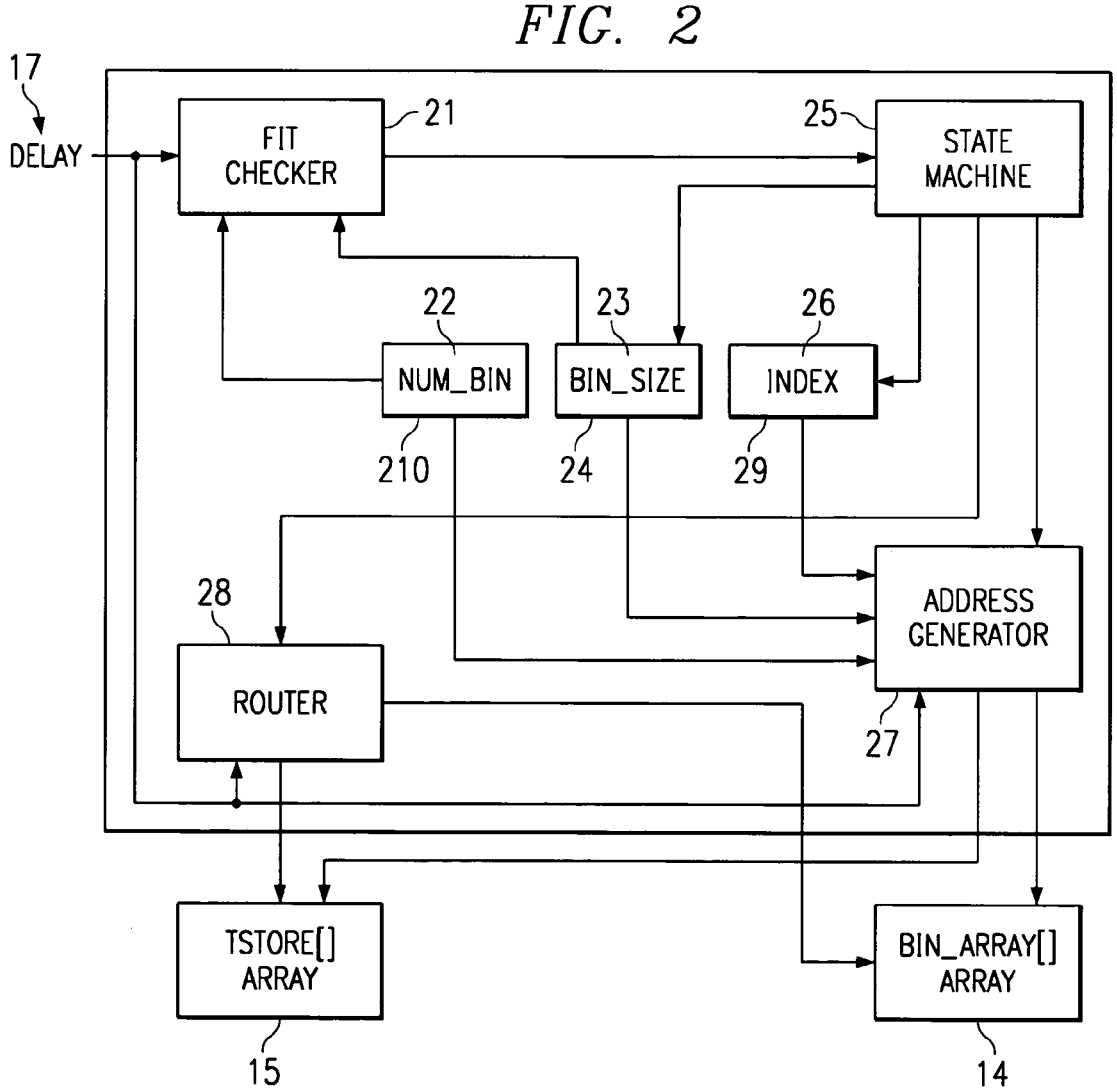
FIG. 2 depicts a block diagram of the internal arrangement of the programmable logic device of FIG. 1.

FIG. 2 depicts a block diagram of the internal arrangement of the PLD 11. The fit checker mechanism 21 implements the comparison from the pseudo-code to determine whether the delay value 17 would fit inside the current bin array 14. The checker mechanism 21 uses the num_bin (number of bins) value 22 stored in register 210 and the bin_size (current bin size) value 23 stored in register 24 in making the comparison. The current bin_size times the num_bin minus one ((BS*NB)−1) indicates the largest delay value that would fit into the current bin array. This is because the delay value of 0 ns is treated as a valid delay and so it needs to be accounted for in the range of the first bin ie. 0-. If delay value would fit, the state machine 25 requests that the router 28 increment the value stored at the bin address location provided by the address generator 27. Note that the router 28 could either send an increment signal to a counter (not shown) that would provide the new value for the bin, or the router 28 would provide the new value for the bin. The address generator uses the index value 26 stored in register 29, and num_bin (number of bins) value 22 stored in register 210, and the bin_size (current bin size) value 23 stored in register 24 and the delay value 17 in generating the address of the proper bin. If the delay value would not fit, the state machine requests that the router 28 store the actual value of the delay value to the tstore array [ ] 15 in the address provided by the address generator 27. The address generator uses the index value 26 stored in register 29 in generating the address of the tstore [ ] array. After storing the delay value, the state machine would increment the index value and change the bin_size. Note that the index value 26 controls the row (or column) of the bin array that is being used as the current set of bins. Thus, as the index value is incremented, the next set of bins is being used as the current set of bins. Also note that the same index is being used to control the address of the tstore array. Thus, a single increment of the index value causes different locations of the arrays to be accessed.

Note that the inventive mechanism has been described in terms of a packet delay value performance metric. However, the inventive mechanism can be used to maintain values for other network performance metrics, for example, interarrival time which is the time between the arrival of two consecutive packets, or the interdeparture time which is the time between the departure of two consecutive packets. The inventive mechanism can be used to track and maintain any performance metric that is desired to be maintained in a bin format, wherein the range of values of the bins may need to be scaled based upon the metric values being received from the network. Because of the scalability of the inventive mechanism, the inventive mechanism is particularly useful when the information about the network regarding the particular metric is not known. The inventive mechanism may be set to a low level bin size value for the metric, e.g. normalized 1, which will quickly converge to a useful size value.

Figure 3:
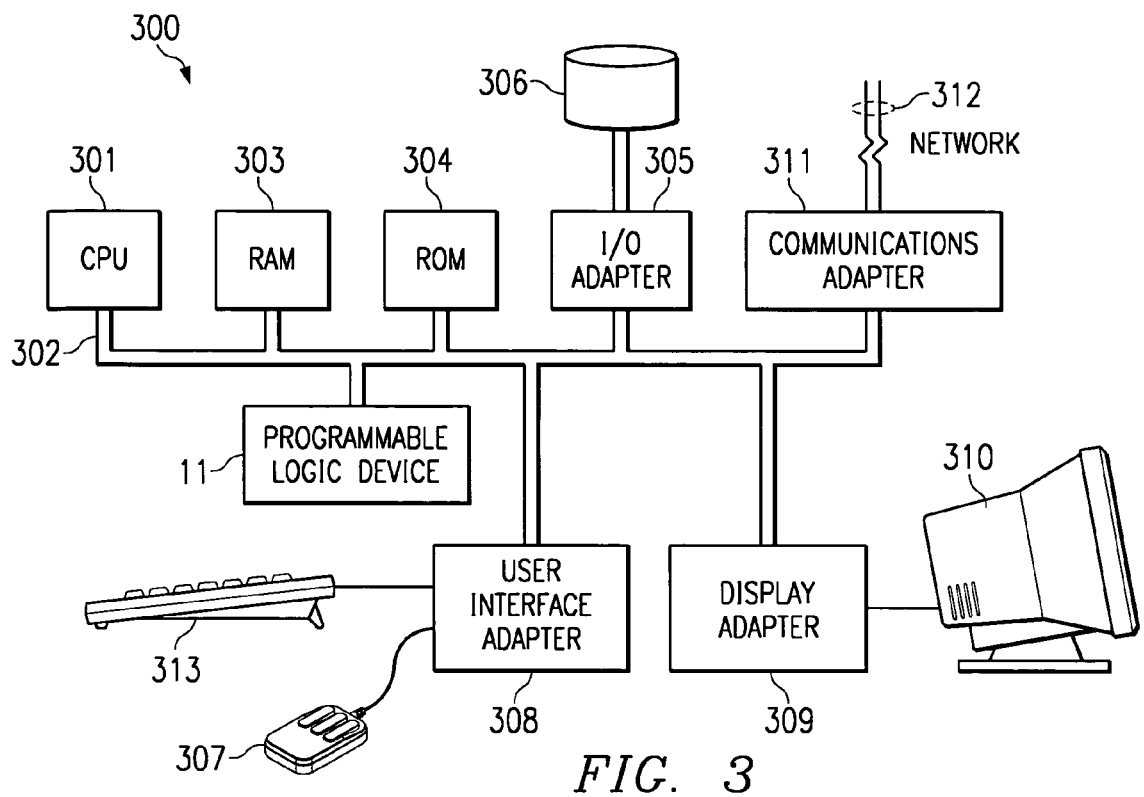
FIG. 3 depicts a block diagram of a computer system adapted to implement the present invention of FIGS. 1 and 2.

FIG. 3 illustrates a computer system 300 adapted for use with the present invention. In the system 300, central processing unit (CPU) 301 is coupled to bus 302. The programmable logic device 11 is also coupled to bus 302. In addition, bus 302 is coupled to random access memory (RAM) 303, read only memory (ROM) 304, input/output (I/O) card 305, communications card 311, user interface card 308, and display card 309. RAM 303 and ROM 304 hold user and system data and programs as is well known in the art. I/O card 305 connects storage devices 306, such as hard drive, CD-ROM, or tape drive, to the computer system. Communications card 311 is adapted to couple the computer system to a local, wide-area, or Internet network 312. User interface card 308 couples user input devices, such as keyboard 313 and pointing device 307, to the computer system 300. Finally, display card 309 is driven by CPU 301 to control the display on display device 310. CPU 301 may be any general purpose CPU, such as a HP PA-8200. However, the present invention is not restricted by the architecture of CPU 301 as long as CPU 301 supports the inventive operations as described herein.

Although the present invention and its advantages have been described in detail, it should be understood that various changes, substitutions and alterations can be made herein without departing from the spirit and scope of the invention as defined by the appended claims.

What is claimed is:

1. A method for managing performance data about a network for graphical display, wherein the performance data is in the form of data values, wherein method uses a plurality of bins for maintaining a count of instances that data values are within a current range, wherein each bin maintains a number of instances that data values are within a particular portion of the current range, wherein each portion has an equal size, and wherein the method further uses an array for maintaining performance data values that are not within the current range, the method comprising the steps of:

receiving a data value;

determining whether the data value is within the current range;

incrementing the number of a particular bin of the plurality of bins, if the data value is within the current range, wherein the particular bin is selected based on the data value;

storing the data value in the array, if the data value is not within the current range; and scaling the current range and the size of the portions, if the data value is not within the current range.

2. The method of claim 1, further comprising the step of:

repeating the steps of determining, incrementing, storing and scaling for each received data value.

3. The method of claim 1, further comprising the step of:

formatting the numbers for graphical display based on the size of the portions and the current range.

4. The method of claim 3, further comprising the step of:

displaying the formatted numbers as a graph to a user.

5. The method of claim 1, wherein the network transports data packets, and the data values are latencies in transporting the data packets through the network.

6. The method of claim 1, further comprising the step of:

determining an amount of jitter that the network is incurring from the numbers of the plurality of bins.

7. The method of claim 1, further comprising the step of:

re-calculating the numbers of the plurality of bins according to the scaled size of the portions.

8. The method of claim 1, wherein the plurality of bins are one set of bins of a plurality of sets of bins, wherein each set of bins is formed from one dimension of elements of a two dimensional array, the step of scaling comprises:

incrementing an index to point to a subsequent set of bins in the two dimensional array; and multiplying the current range and the size of the portions by a factor.

9. The method of claim 8, wherein:

the factor is 2.

10. The method of claim 8, further comprising the steps of:

receiving a subsequent data value;

determining whether the subsequent data value is within the factored range;

incrementing the number of a particular bin of the plurality of bins, if the subsequent data value is within the factored range, wherein the particular bin is selected based on the subsequent data value;

storing the subsequent data value in the array, if the subsequent data value is not within the factored range; and scaling the factored range and the size of the factored portions, if the subsequent data value is not within the factored range.

11. The method of claim 10, further comprising the step of:

re-calculating the numbers of the plurality of bins according to the scaled size of the factored portions.

12. A system for managing performance data about a network for graphical display, wherein the performance data is in the form of data values, wherein the system comprises:

a plurality of bins for maintaining a count of instances that data values are within a current range, wherein each bin maintains a number of instances that data values are within a particular portion of the current range, wherein each portion has an equal size;

an array for maintaining performance data values that are not within the current range;

logic for receiving a data value;

logic for determining whether the data value is within the current range;

logic for incrementing the number of a particular bin of the plurality of bins, if the data value is within the current range, wherein the particular bin is selected based on the data value;

logic for storing the data value in the array, if the data value is not within the current range; and logic for scaling the current range and the size of the portions, if the data value is not within the current range.

13. The system of claim 12, further comprising:

logic for formatting the numbers for graphical display based on the size of the portions and the current range.

14. The system of claim 13, further comprising:

a display for presenting the formatted numbers as a graph to a user.

15. The system of claim 12, wherein the network transports data packets, and the data values are latencies in transporting the data packets through the network.

16. The system of claim 12, further comprising:

logic for determining an amount of jitter that the network is incurring from the numbers of the plurality of bins.

17. The system of claim 1, further comprising:

logic for re-calculating the numbers of the plurality of bins according to the scaled size of the portions.

18. The system of claim 12, wherein the plurality of bins are one set of bins of a plurality of sets of bins, wherein each set of bins is formed from one dimension of elements of a two dimensional array, the logic for scaling comprises:

logic for incrementing an index to point to a subsequent set of bins in the two dimensional array; and logic for multiplying the current range and the size of the portions by a factor.

19. The system of claim 18, further comprising:

logic for receiving a subsequent data value;

logic for determining whether the subsequent data value is within the factored range;

logic for incrementing the number of a particular bin of the plurality of bins, if the subsequent data value is within the factored range, wherein the particular bin is selected based on the subsequent data value;

logic for storing the subsequent data value in the array, if the subsequent data value is not within the factored range; and logic for scaling the factored range and the size of the factored portions, if the subsequent data value is not within the factored range.

20. The system of claim 19, further comprising:

logic for re-calculating the numbers of the plurality of bins according to the scaled size of the factored portions.

* * * * *

UNITED STATES PATENT AND TRADEMARK OFFICE
CERTIFICATE OF CORRECTION

PATENT NO. : 6,993,578 B1
DATED : January 31, 2006
INVENTOR(S) : Dmitroca

It is certified that error appears in the above-identified patent and that said Letters Patent is hereby corrected as shown below:

<u>Title page,</u>
Item [57], ABSTRACT,
Line 14, delete "used" and insert -- use --.

Signed and Sealed this

Ninth Day of May, 2006

JON W. DUDAS
*Director of the United States Patent and Trademark Office*